May 19, 1959 W. A. BARNES ET AL 2,886,992
TOOLS FOR COLD PRESSURE WELDING
Filed Dec. 22, 1955 2 Sheets-Sheet 1
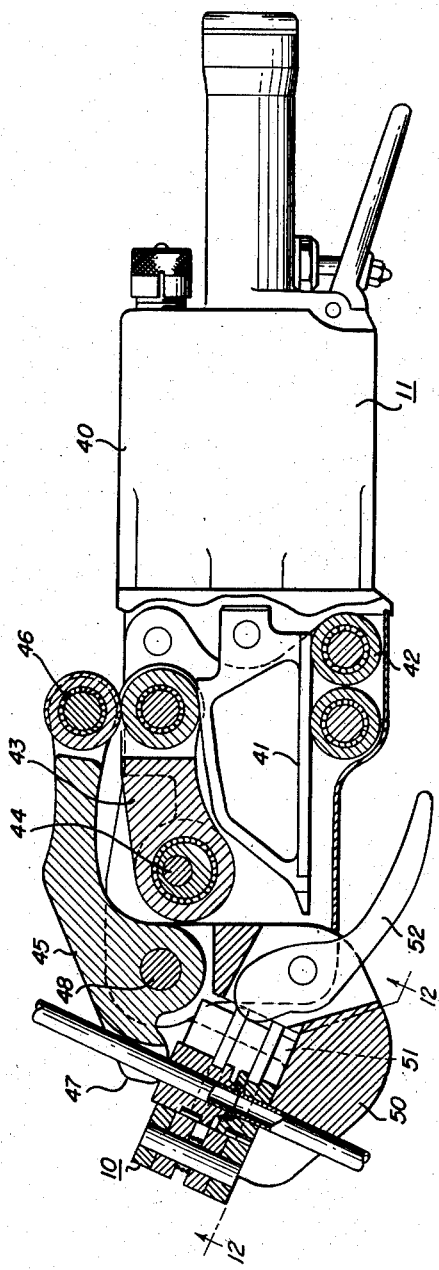
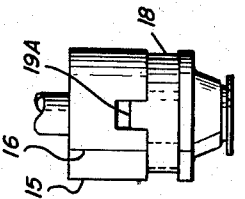
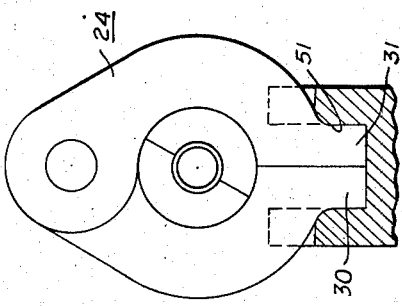
INVENTORS
WILLIAM A. BARNES
STANLEY ZYSK
BY Ray S Pyle
ATTORNEY

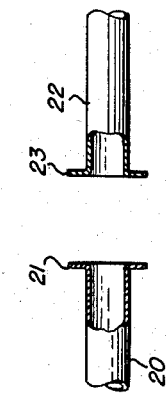
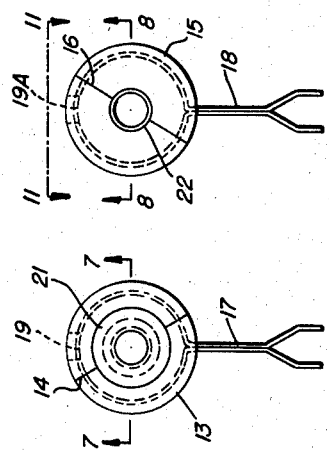
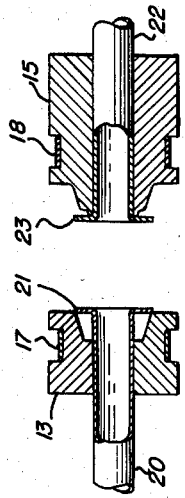
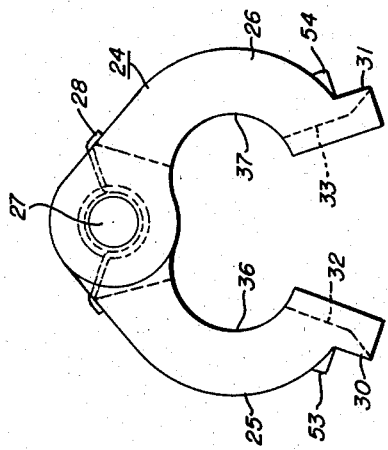
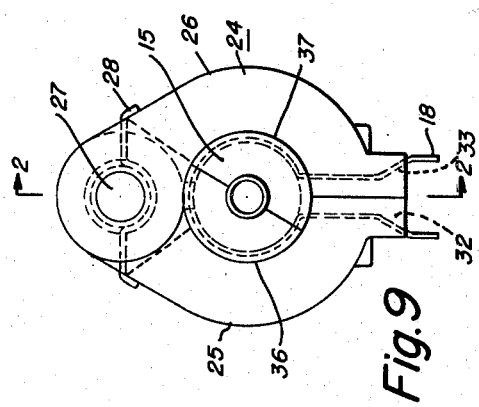
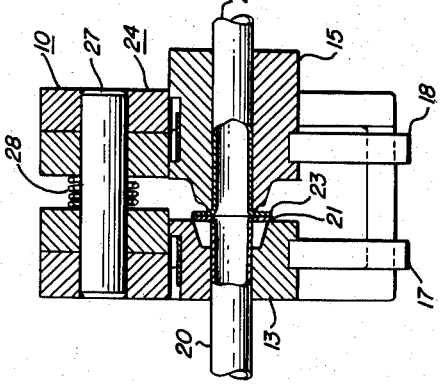
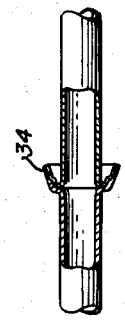
INVENTORS
WILLIAM A. BARNES
STANLEY ZYSK
ATTORNEY

United States Patent Office 2,886,992
Patented May 19, 1959

2,886,992

TOOLS FOR COLD PRESSURE WELDING

William A. Barnes, Utica, and Stanley Zysk, Little Falls, N.Y., assignors, by mesne assignments, to Kelsey Hayes Company, Detroit, Mich., a corporation of Delaware Application December 22, 1955, Serial No. 554,746

8 Claims. (Cl. 78—82)

This invention relates to the tools and the system of butt welding by cold welding, and relates in particular to the joining of system components on a production basis.

Cold welding in general, and the welding of specific types of joints is now well known and understood. Many patents have been issued on methods of cold welding.

However, welded unions are now made with a specific tool. Pieces to be welded are generally brought to the tool. If necessary, the tool can be brought to the pieces. In either event, the pieces are installed in the tool, prepared for welding, and then welded. The tool is then removed and moved to the next job.

It is a major object of this invention to provide a die assembly that may be assembled with the workpieces therein, and a power device is then brought to the assembly. Thus, one operator may install the die assembly and another may follow with a power tool to produce the weld.

Another object of this invention is to provide production equipment for cold welding a series of workpieces, wherein a plurality of operators may jointly produce a series of steps to make the series of welds.

A more specific and specialized object of this invention is to provide cooperating cold welding dies residing within a retainer, and separate actuation means to apply closing force to the dies.

A further object of this invention is to provide a closable retainer which defines a confinement guide for the cold welding dies, and to provide interfitting surfaces between the retainer and a power tool to support and hold the retainer closed during the cold welding operation as well as reinforcing the retainer against distention under high welding forces.

Therefore, a specialized object of this invention is to provide a relatively lightly constructed retainer which is nevertheless able to resist high welding pressures by interlocking the retainer with the power tool for reinforcement.

And another object of this invention is to hold split cold welding dies radially oriented to prevent the interface of one split die from becoming aligned with the interface of the cooperating die.

Still another object of this invention is to provide an assembly of workpieces, dies, and retainer separate from a power applying tool, which assembly will hold the workpieces in abutted position pending the application of cold welding power.

Other objects and a fuller understanding of this invention may be had by referring to the following description and claims, taken in conjunction with the accompanying drawings, in which:

Figure 1 is a side view, partially in section, of an assembly of a die retainer with cold welding dies and workpieces therein, and the assembly interlocked with and receiving die actuation power from a pneumatic actuation power tool source;

Figure 2 is a sectional view through an assembly of the retainer, dies, and workpieces, taken along line 2—2 of Figure 9;

Figure 3 is a plan view in opened position of the preferred die retainer;

Figure 4 illustrates two workpieces prepared for welding;

Figure 5 is a face view of one cold welding die with a prepared workpiece held therein;

Figure 6 is a face view of another cold welding die with a prepared workpiece held therein;

Figure 7 is a sectional view taken along line 7—7 of Figure 5;

Figure 8 is a sectional view taken along line 8—8 of Figure 6;

Figure 9 is a plan view of the retainer closed and the dies and workpieces held therein;

Figure 10 is a side view of the workpieces welded;

Figure 11 is a section taken along line 11—11 of Figure 6; and,

Figure 12 is a section taken along the line 12—12 of Fig. 1.

Referring now to the drawings, there is illustrated the preferred embodiment of the invention as adapted to butt weld tubular conduits. Tubular conduits are selected as one example of the type of workpiece that may be cold welded by the present invention, but the invention is in no manner limited to such workpieces.

The reference character 10, in both Figures 1 and 2, indicates a retainer and die assembly generally, and the reference character 11 indicates an actuating tool to be used in association with the retainer and die assembly.

In most instances wherein a series of workpieces are to be cold welded on a production basis, the members being welded are of sufficient length that it is impractical to remove the dies in any way other than by employing split dies which may be assembled over the workpieces and removed from the workpieces by assembling the parts of the dies. Furthermore, in this manner, the dies are able to grip down upon the workpieces. In Figures 5 and 6 of the drawings there are illustrated a first split die 13 having an interface 14, and a second split die 15 having an interface 16. A longitudinal section of the dies 13 and 15 is set forth in Figures 7 and 8. Workpieces 20 and 22 are set forth separately in Figure 4 of the drawings and within the dies in Figures 7 and 8 of the drawings. Workpiece 20 is prepared with a flange 21 and workpiece 22 is prepared with a flange 23. The preparation of the workpieces 20 and 22 with the respective flanges thereon is peculiar to the welding of tubular elements, and will not necessarily be present on other types of workpieces, such for example as rods and wire. The particular configuration of the die faces and the reason for the flanges may be learned by referring to application Serial No. 512,807 filed June 2, 1955. It should clearly be understood, however, that the face configuration of the dies 13 and 15, and the prior preparation of the workpieces 20 and 22, are employed merely for the purpose of illustrating the present invention.

One particular application for the present invention, in the joining of tubular members, is the joining of copper systems with aluminum tubes leading into particular elements, such for example as condensers in a refrigeration system. This invention materially aids in the production joining of various elements into an operating unit on a production line basis. One operator assembles the dies upon the ends of two tubular members to be joined. A second operator applies the welding power to the dies and produces the weld. That operator then moves the power tool to another assembled die couple and produces another weld. While the operator proceeds from union to union producing the actual weld, still a third operator can dismantle the dies from the completed weld. Thus, a team can produce welds rather than requiring a single operator to be adept at the entire operation and confine the bulky power actuation device to one location while the set up assembly is made and while the dies are being dismantled from the completed job.

The pressures required to produce a cold pressure weld are quite high. The pressures cause the metal to flow in the peculiar manner which produces a dependable cold welded union. These pressures would quite easily separate the split dies 13 and 15 if not restrained against separation. In the present invention, the split dies 13 and 15 are held against separation by confining the dies to a confinement guide which allows the dies to move toward one another in a specified work path but confines the dies against appreciable separation. In the preferred embodiment of this invention, a retainer 24 is composed of a first and second retainer section 25 and 26 pivotally hinged by a pivot pin 27 and urged to a closed position by a spring 28. Thus, a multiple section and openable retainer is provided. The pivotally hinged embodiment is superior to other forms of joining, and therefore is set forth as the preferred embodiment.

Section 25 of the retainer has an inner surface 36 whereas section 26 has an inner surface 37. Surfaces 36 and 37 jointly define a confinement guide to confine the split dies 13 and 15 to a closed position with a snug fit that will allow the dies to move together under pressure but will prevent opening of the dies under the forces of the flowing workpieces being welded.

Thus, after the workpieces 20 and 22 have been prepared for welding, the split dies 13 and 15 are opened and reassembled over the workpieces in the manner indicated in Figures 7 and 8. Thereafter, the retainer 24 is closed down over the dies and the dies are thus brought into alignment within the confinement guide portion of the retainer 24. Pressure may then be applied to the ends of the dies 13 and 15 to force them together within the confinement guide of the retainer for the purpose of producing the cold welded union of the workpieces.

The basic concept of the retainer and die assembly has been explained, but as thus far set forth there are some desirable characteristics which have not been explained that make the assembly considerably more productive and useful. First, it has been found that the interfaces 14 and 16 of the dies must never become aligned if a dependable weld is to be made each time. Accordingly, as illustrated best in Figures 5, 6 and 11, a spring guide holder device 17 is employed to encompass the split die 13, and a similar spring guide holder device 18 is employed with the die 15. In Figure 11, it will be seen that a projection or ear 19 on the holder 17, and a similar ear 19A on the spring 18 interfits with the die to maintain the retainer in a fixed rotational position with respect to the assembled split die. Each die is preferably recessed around the periphery thereof as illustrated in order that the spring may sit below the gripping surface of the die and not interfere with the guiding and retention of the split dies by the confinement guide surfaces of the retainer. By extending the ears 19 and 19A into a side notch, as illustrated in Figure 11, a fixed relative position of the guide holder is assured. These spring guide holders 17 and 18 encompass the dies and hold the dies together temporarily during assembly upon the workpieces. Thus, the dies may be opened against the resiliency of the spring retainer devices and allowed to snap back upon the workpieces and be held upon the workpieces temporarily pending the engagement of the dies into the retainer 24.

The retainer sections 25 and 26 are pivotally hinged for opening and closing, and contact in an unjoined end position. In the preferred embodiment of the retainer construction, the sections 25 and 26 end in projecting lips 30 and 31 as illustrated in Figures 3 and 9. Each of the projecting lips 30 and 31 is recessed along part of the width thereof to produce recesses 32 and 33 respectively. When the sections 25 and 26 are closed as illustrated in Figure 9, the recesses 32 and 33 jointly define a longitudinal guide slot 323 which extends on a plane through the axis of the work path established by the surfaces 36 and 37 for the split dies.

The spring guide holders 17 and 18, as illustrated best in Figures 5 and 6, not only encompass the dies to yieldably urge the dies into a closed position, but extensions 38 and 39 thereof extend out as finger grip portions. These extensions 38 and 39 project through the guide slot and lay against the surfaces defining the recesses 32 and 33, as best seen in Figure 9 of the drawings. In Figure 2 the longitudinal extent of the recess 33 may be seen. Therefore, it may be visualized that the longitudinal extent of the recesses 32 and 33, defining slot 323, will limit the longitudinal separation of the spring guides 17 and 18, and consequently will limit the separation extent of the dies 13 and 15. As a practical matter, the extent of the guide slot 323 is such that the dies will position the workpieces substantially into initial contact. Therefore, the only movement possible is a closing movement in a cold welding action. Furthermore, by positioning of the extensions of the guides 17 and 18 into the slot 323, the interfitting of the ears 19 and 19A will fix and determine the rotative position of the dies 13 and 15 within the confinement guide of the retainer 24. Therefore, the dies are held against separation and against opening by the retainer, and also are limited to a predetermined separation. Consequently, after the split dies are assembled onto the workpieces and the retainer 24 closed upon the dies and workpieces, the entire assembly will hold together and position the workpieces into a preliminarily joined union. In the example of a refrigeration system, therefore, the tubular members are positioned exactly where they are to be joined and in view of the fact that the tubular members generally extend from some member and therefore are sufficiently supported to hold the weight of the dies and retainer, the dies and retainer will provide a temporary union of the tubular members and will be supported in turn by the tubular members in a suspended position readily accessible for applying an actuating tool to close the dies in the retainer.

Once again referring to the extreme pressures necessary to produce a cold weld, it was found that retention of the dies requires particular attention to these extreme stresses. It was found that locking clips and catches were unsatisfactory because the retainer requires extreme bulk in order to hold the dies of its own strength without springing. In small size tubing, some 18,000 pounds of pressure are exerted in compressing the dies and it was found that ordinary retainer constructions will spring enough to allow the material to squirt out between the dies. Several attempts at making massive retainers were carried out before the discovery of the present invention was made. According to this invention the projecting lips 30 and 31 are hooked into a holding bracket structure on the air tool employed for actuation of the dies.

Referring now to Figure 1, a suitable actuating tool device is set forth for supporting the retainer and actuating the dies. This tool as illustrated is a pneumatic tool having a conventional piston and cylinder within a housing 40 for driving a cam ram 41 through a reciprocatory path. Ram 41 is supported upon two bed bearings 42. An adjustable rider 43 is tiltably actuated by the cam configuration of the ram 41. This rider 43 is employed for providing adjustment of the actuation exerted by the tool. An eccentric 44 determines the pivot of the rider 43 and accordingly determines the amount of actuation obtained by the rider throughout the entire operating cycle thereof.

The tool 11 is equipped with a pivoted lever ram 45 having a rider bearing 46 to ride and receive driving force from the adjustable rider 43, and having a pronged ram end 47 to apply pressure to both sides of the workpiece upon the back surface of one of the split dies. In Figure 1 the pressure is illustrated as being applied to the split die 15 which is made sufficiently long to project from the confinement guide of the retainer for the purpose of receiving such driving force. The lever ram 45 is pivoted about a suitable pivot pin 48.

A bed 50 receives and supports the assemblage of the retainer with the dies therein. The bed 50 provides the holding bracket structure previously referred to as being the factor which permits the use of a relatively light weight retainer which will adequately resist opening under the tremendous pressure employed. The holding bracket, in this embodiment of the invention, consists of a recess 51 on the bed 50 into which the projecting lips 30 and 31 of the retainer 24 may project with a tight and close fit. Reference character 51 extends to a dotted line representing the recess side wall hidden by the lips 30 and 31. Recess 51 is nothing more than a slot dimensioned to receive the closed lips 30 and 31. Since retainer sections 25 and 26 pivot about pin 27, pressure within the retainer 24 will press the lips 30 and 31 tightly against the side walls of the slot defining recess 51. Thus, no fastening device is required for the retainer 24, and the closing retention is provided by the interfit of the actuating tool with the retainer. Not only does such interfitting provide a stronger retainer construction, but such interfitting eliminates the need for independent lock means to hold the retainer tightly closed upon the operating dies.

As will readily be understood, the dies are assembled without pressure and the retainer 24 is closed upon the dies without pressure. Even with exceedingly close fitted construction, there will be some tendency of retainer 24 to open under internal pressures. Accordingly, the projecting lips 30 and 31 tend to spread and therefore wedge and stick by friction into the recess 51 after a weld has been made. Accordingly, an ejection lever 52 has been provided for pushing the retainer and die assembly out of the recess 51. Shoulders 53 and 54 are also provided on the retainer and may be used as pry surfaces in place of, or in addition to, the lever 52. A screwdriver may be used as a pry to loosen the retainer by prying against these shoulders.

Therefore, this invention contemplates a tool and tool actuation combination for producing work on workpieces wherein the tool assembly provides for relatively closable die members having faces formed to produce work on some workpiece or combination of workpiece positioned between the dies when the dies are closed together. The invention then provides for means to hold the first and second dies in a fixed aligned work path during the operation of the dies. The dies may be identical, and usually are, but may consist of any suitable dies which may be relatively closed for producing the work action and which may be held aligned and closed during the work action. Furthermore, according to this invention, the dies are assembled together with the workpiece means in a preliminary relationship wherein the workpiece means is ready for the work to be performed thereon and the dies are ready to perform that work. No external holding device other than this assembly is required. Accordingly, the assembly can be made ready prior to the actual work performing operation. Thereafter, a seperate power tool means is applied to the assembly for producing a closing force on the assembly and to cause relative closing of the first and second dies. Preferably, the die assembly and power device are interlocked during the application of power to thereby provide reinforcement of the die assembly. The die assembly may therefore be made lighter than would be required if fully self-sustained, and accordingly more flexible in placement ability. The many ramifications of the invention are believed to be adequately incorporated and suggested within the description of the foregoing preferred embodiment of the invention.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and the scope of the invention as hereinafter claimed.

We claim:

1. Tool assembly for butt welding workpieces, comprising, a first and second split die, each die having a plurality of die sections mated along section interfaces, said die sections of each die having interior surfaces defining a workpiece holding cavity, each said die having a welding face surface formed to cooperate with the face of the other die in producing a cold pressure welding of workpieces held by the dies, said dies operating to produce such weld by closing together along a work path, a guide holder for each die, said guide holder having a loop portion holding the die sections assembled in operative relationship, said guide holder having a guide stem portion extending from the assembled holder and die, said guide holder having interfitting surfaces with the assembled die preventing relative change of positional relationship of the guide stem with respect to the die, a retainer having surfaces defining a die confinement chamber, said first and second dies fitting said die confinement chamber in closely retained relationship when fully closed, said retainer having a longitudinal guide extending in the direction of said work path, said guide stem portion of the guide holder confined to follow said longitudinal guide of the retainer and thereby hold the first and second dies in predetermined rotational position relationship in said die confinement guide, said power device having holding engagement with the retainer in reinforcement of the retainer against distention, said power device having power means driving said first and second dies together within said confinement guide along said work path.

2. Tool assembly for welding workpieces, comprising, a first and a second split die having mutually cooperating face surfaces adapted to weld workpieces held by said first and second dies under high pressure and confinement of workpiece flow, said dies being closable along a common work path for driving said faces toward one another, a die retainer for confinement and guiding of said first and second dies in said work path, said retainer being a plurality of complementary sections having surfaces jointly defining a confinement guide through the retainer, said first and second split dies slidably fitting with close tolerance within said confinement guide only when the split dies are fully closed, said plurality of complementary sections joined into an openable annular member with first and second unjoined terminus ends, a power device removably engageable to the retainer for supporting said retainer and driving said first and second split dies together along said work path within said confinement guide, said power device having immobile surfaces defining a socket into which said first and second terminus ends of said retainer are seated to hold said retainer against opening.

3. In claim 2, said retainer comprising a first and a second half-retainer section having a first and a second junction, a hinge pivot joining said first junction, said second junction having surfaces interfitting with rigid socket holding surfaces on the power device to hold the retainer closed.

4. Tool assembly for welding flared tubing, comprising, first and second split dies for producing the weld, a retainer for confining said first and second dies against opening under welding pressure and for guiding the dies longitudinally in properly orientated position along a welding work path, and a power device supplementing the holding power of the retainer and keeping the retainer closed upon the dies while providing closing power upon the dies, each said first and second split dies having a plurality of parts jointly defining the die, said die thereby being closable upon a workpiece, a guide holder comprising a resilient member encompassing said die and exerting a resilient force holding said die parts assembled, said guide holder having surfaces interfitting with said die establishing a fixed relative position therebetween, a guide extension from said guide holder, said retainer being a plurality of complementary members having surfaces jointly defining a confinement guide through the retainer, said first and second dies slidably fitting with close tolerance within said confinement guide only when the split dies are fully closed, said plurality of complementary members joined into an openable annular member with first and second unjoined terminus ends, said terminus ends having opposed face surfaces, each face surface having a recessed portion, the recessed portions of the terminus ends jointly defining a longitudinal guide slot extending in the direction of said confinement guide, said guide extensions from said die holders of the first and second split dies extending into said guide slot, selective location of the interfitting surfaces of the guide holder and dies thereby providing positive radial offsetting of interfaces of the first split die with respect to the second split die, said power device and said terminus ends of the retainer having mutually interfitting engagement preventing opening of the retainer while engaged by said power device, said power device having an anvil against which the retainer is supported and a ram to contact one of the first and second split dies and close the dies within the retainer confinement guide.

5. Tool assembly for welding workpieces, comprising, a retainer and die assembly adapted to hold workpieces in temporary alignment and to produce a cold pressure welded union when actuated, and a power device separately applicable to the assembly for securing and reinforcing the assembly and to apply closing force to the dies of the assembly, said assembly comprising a first and a second die having workpiece holding means therein and having mutually cooperating face surfaces for producing a cold pressure weld between workpieces, said dies being operative by relative closing of said cooperating faces along a work path, a segmented retainer having a plurality of segments radially openable, said segments having inner surfaces mutually defining an internal die confinement guide, said first and second dies fitting said confinement guide in closely retained relationship, said power device having rigid female recess surfaces and said retainer having male surfaces fitting said recess surfaces, said power device thereby reinforcing and holding said retainer against distention, said power device having power means driving said first and second dies relatively closed along said work path.

6. Tool assembly for performing high pressure operations, comprising, a retainer and slit die assembly having first and second split dies mountable upon a workpiece and held in pre-operative alignment by the retainer, said dies closable against one another along a work path established by said retainer, and a power device having a rigid body with surfaces interlockable with said retainer after the retainer and dies are pre-assembled and closed into operative position, said rigid body providing a reinforcement of the retainer to hold it closed against distention, and said power device having power means separately applied to the dies and driving the dies closed along said work path.

7. Tool assembly for performing high pressure operations, comprising, a retainer housing composed of separable and distendable sections, the assembled retainer having surfaces defining a die confinement guide, a die assembly residing in said die confinement guide, said die assembly comprising at least one split die closable against a second die along a work path established by said die confinement guide, said split die held closed and the die assembly guided in said work path by said retainer die confinement guide, a power device having a rigid body with surfaces interlockable with said retainer housing whenever the housing is assembled and closed, said rigid body providing a reinforcement of the retainer housing to hold it closed against distention, and said power device having power means separately applied to the dies and driving the dies relative to the confinement guide established by the housing.

8. Tool assembly for welding workpieces, comprising a die assembly operable under confinement of a retainer by a separable power device which reinforces the retainer and actuates the dies, said die assembly comprising at least one split die closable against a second die along a work path to weld workpieces held thereby, said retainer composed of a plurality of separable members having interior surfaces jointly defining a longitudinal confinement guide in which said dies operate to produce a weld action, said dies held closed and guided in said work path by said retainer confinement guide, a resilient holding and orientation member encompassing said split die to yieldably hold the split die in assembled relationship, said member having a stem portion, said retainer having a longitudinal guide slot, said stem member residing in said slot to maintain said die orientated in preselected position within said confinement guide, said power device having a body with rigid surfaces in holding engagement with the retainer in reinforcement of the retainer against distention, said power device having power means driving said dies toward one another within said confinement guide along said work path.

References Cited in the file of this patent
UNITED STATES PATENTS

| | | |
|---|---|---|
| 199,180 | Bricknell | Jan. 15, 1878 |
| 2,003,488 | Hook | June 4, 1935 |
| 2,144,231 | Schwarz | Jan. 17, 1939 |
| 2,283,933 | Jones et al. | May 26, 1942 |
| 2,297,885 | Graf et al. | Oct. 6, 1942 |
| 2,362,943 | Speth | Nov. 14, 1944 |
| 2,427,597 | Gardner et al. | Sept. 16, 1947 |
| 2,608,887 | Sowter | Sept. 2, 1952 |
| 2,639,634 | Sowter | May 26, 1953 |
| 2,683,999 | Hammond | July 20, 1954 |
| 2,700,906 | Allen | Feb. 1, 1955 |
| 2,703,998 | Sowter | Mar. 15, 1955 |
| 2,754,704 | Barnes et al. | July 17, 1956 |